Oct. 14, 1969          R. J. OERTEL          3,473,001
WELDING MACHINE CARRIAGE AND TRACK ASSEMBLY
Filed April 10, 1967          3 Sheets-Sheet 1
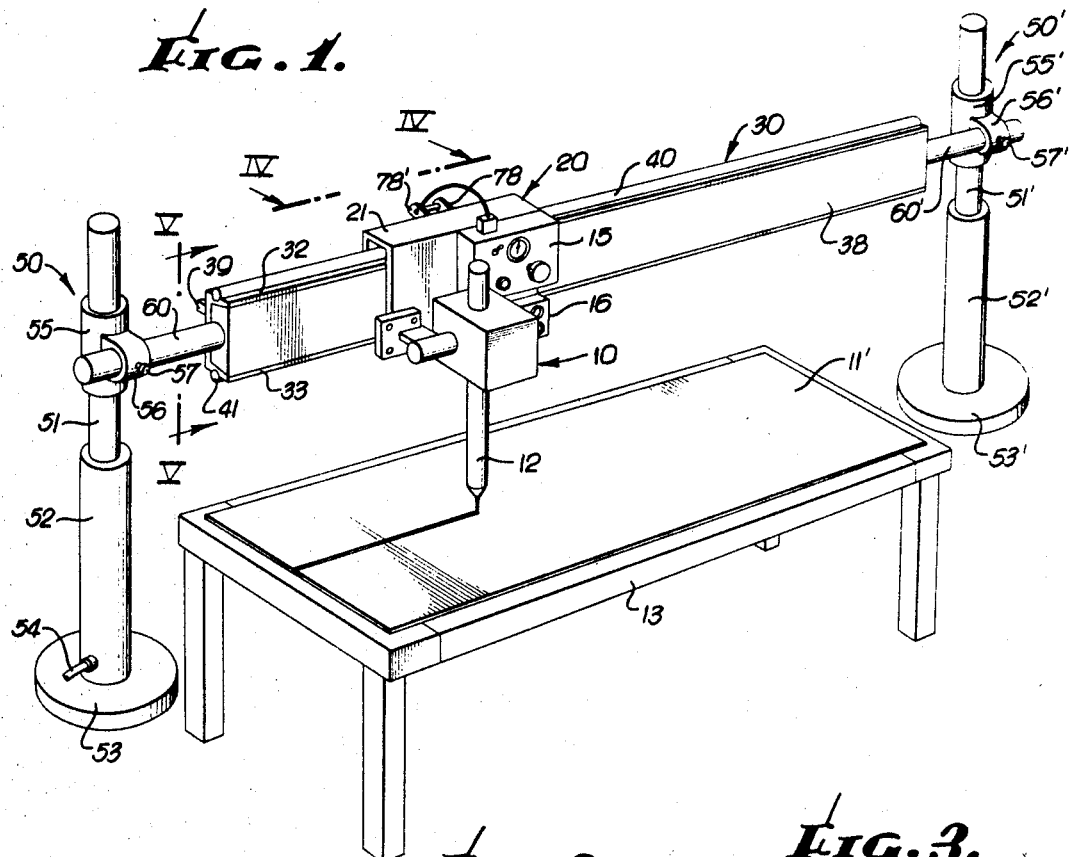
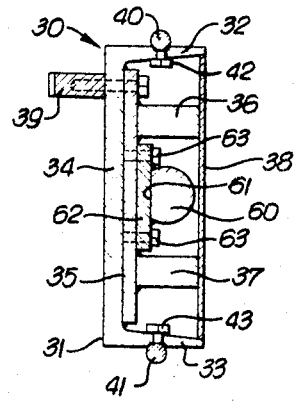
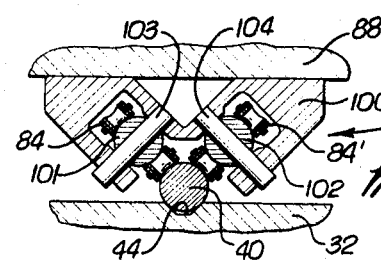
INVENTOR.
RICHARD J. OERTEL
By
Miketta, Glenny, Poms & Smith
ATTORNEYS.

Oct. 14, 1969   R. J. OERTEL   3,473,001
WELDING MACHINE CARRIAGE AND TRACK ASSEMBLY
Filed April 10, 1967   3 Sheets-Sheet 2

INVENTOR.
RICHARD J. OERTEL
BY
Miketta, Glenny, Poms & Smith
ATTORNEYS.

Oct. 14, 1969 R. J. OERTEL 3,473,001
WELDING MACHINE CARRIAGE AND TRACK ASSEMBLY
Filed April 10, 1967 3 Sheets-Sheet 3
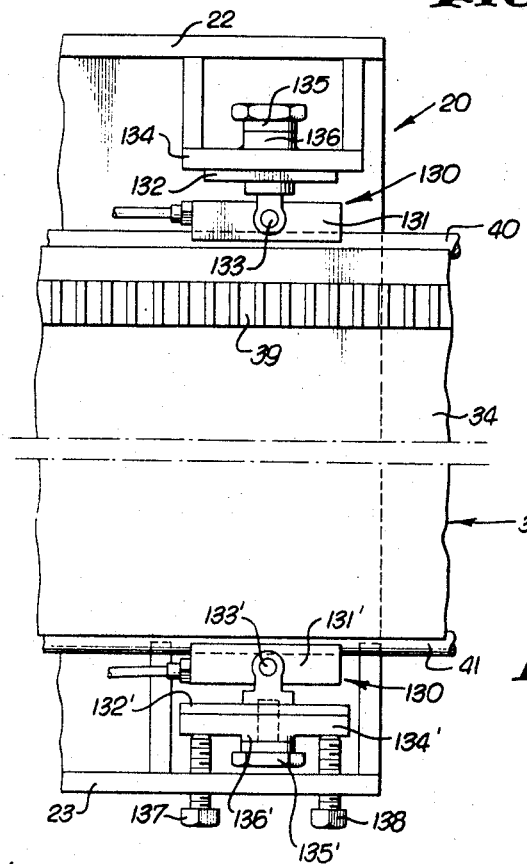
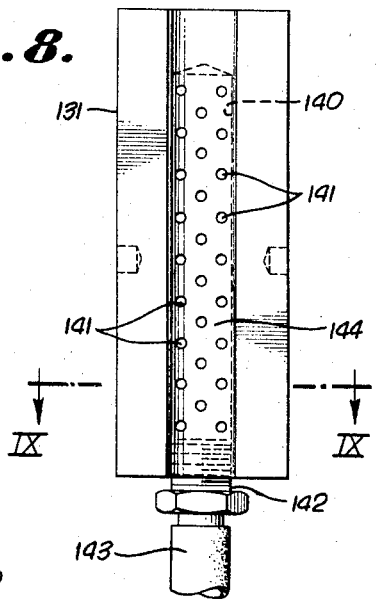
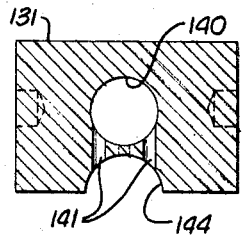
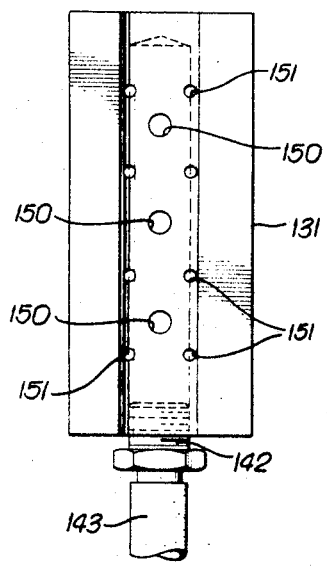
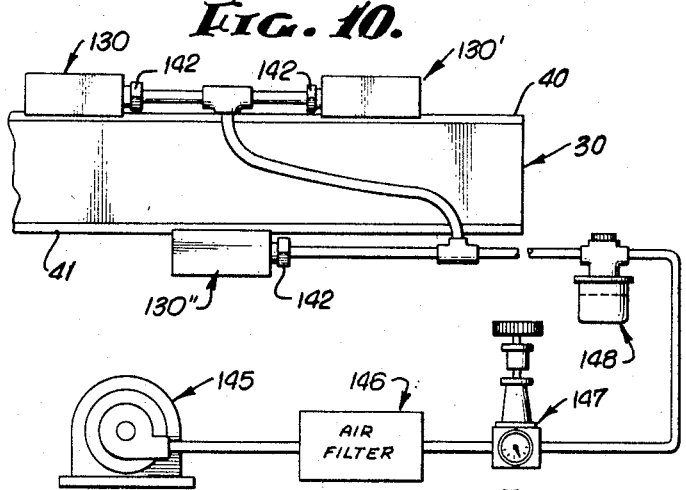
INVENTOR.
RICHARD J. OERTEL
By Mikette, Glenny, Poms & Smith
ATTORNEYS.

United States Patent Office 3,473,001
Patented Oct. 14, 1969

3,473,001
WELDING MACHINE CARRIAGE AND TRACK ASSEMBLY
Richard J. Oertel, South El Monte, Calif., assignor to Airline Welding and Engineering, Gardena, Calif., a corporation of California
Filed Apr. 10, 1967, Ser. No. 629,778
Int. Cl. B23k 9/12
U.S. Cl. 219—125                                11 Claims

ABSTRACT OF THE DISCLOSURE

A universally positionable welding machine carriage and track assembly including carriage means mounting a welding head apparatus for longitudinal movement along a generally horizontal track means which is rotatable through a full 360 degree arc about its longitudinal axis to place the welding head apparatus in any desired radially outwardly extending position during such longitudinal movement of the carriage means or while said carriage means is stationary. The track means includes upper and lower bearing surfaces extending longitudinally thereon to receive bearing means provided on the carriage means. Each bearing surface on the track means comprises a single convex bearing surface and each bearing means includes roller or air bearing elements engaging the associated convex bearing surface along laterally spaced locations thereon to transmit both vertical and lateral loading between said carriage and track means so that the carriage means is easily movable longitudinally along the track means when disposed in any desired position of rotation of the track means.

BACKGROUND OF THE INVENTION

The present invention relates to the field of electric arc welding and particularly to automatically operated welding or burning machines for use in fusion welding of straight line butt joints, cutting of metal plates, electrical or gas, by straight line torch travel over various welding jigs or fixtures and similar conventional automatic welding or cutting operations. Heretofore, such automatic welding operations have been accomplished by mounting a conventional welding head apparatus, such as an electric arc welding head, on a carriage which is longitudinally movable along a stationary track. Normally, such carriage means include roller bearings riding upon a flat upper surface of the stationary track as well as side roller bearings riding along the side of such stationary track. While the welding head apparatus employed in such welding machines have been adjustable vertically relative to their associated carriage and track means, they have not been universally positionable in any desired radially extending position in order to perform difficult welding operations in non-vertical positions.

It is the principal object of the present invention to disclose and provide a welding machine carriage and track assembly adapted to mount a welding head apparatus for longitudinal movement along the track in any selectable radially extending position throughout a full 360 degree arc about the longitudinal axis of the track. It is a further object of the present invention to disclose and provide a universally positionable welding machine carriage and track assembly as in the foregoing object wherein the track means are provided with single convex bearing surfaces on upper and lower portions thereof to receive mating roller or novel air bearing means provided on the carriage in such a manner that the carriage can be moved longitudinally of the track easily and without deviation from its position regardless of the radial disposition of the carriage, track and associated welding head apparatus. These and other objects as well as various advantages of the welding machine carriage and track assembly, according to the present invention, will become apparent to those skilled in the art from a consideration of the detailed description of a preferred exemplary embodiment contained hereinafter.

SUMMARY OF THE INVENTION

Generally stated, the universally positionable welding machine carriage and track assembly, according to the present invention includes track means having upper and lower bearing surfaces extending longitudinally thereof to receive bearing means thereon. Carriage means are provided for mounting the welding head apparatus to the track means for longitudinal reciprocation thereon. Track mounting means are provided for mounting the track means in a generally horizontal disposition and for rotation about its longitudinal axis throughout a 360 degree arc to place the associated welding head apparatus in any desired radially extending position preparatory to stationary use of the welding apparatus or longitudinal reciprocation along the track means.

The carriage means is mounted on the track means for such aforesaid longitudinal movement thereon in a first exemplary embodiment by roller bearing means and in a second exemplary embodiment by novel air bearing means adapted to cooperate with the single upper and single lower bearing surfaces provided on the track means. Such upper and lower bearing surfaces are preferably convex and provided by round bars secured to the track means. The bearing means thus provided on the carriage preferably each transmit both vertical and lateral loading between the carriage and track means so that the carriage can be moved longitudinally of the track means smoothly and without vertical deviation in its path of travel regardless of the rotative positioning of the track means.

It is therefore contemplated that previously difficult welding operations in hertofore inaccessible locations can be easily accomplished by means of the welding machine carriage and track assembly, according to the present invention. The associated welding head apparatus can be positioned over a horizontally disposed work piece for conventional type welding operations. Vertical work pieces can be operated upon by merely rotating the track means 90 degrees to swing the welding head apparatus into a horizontal disposition for subsequent longitudinal movement. Overhead welding operations can be employed by rotating the track means 180 degrees into an inverted position. It will become apparent that the welding machine carriage and track assembly according to the present invention will allow the positioning of a welding head apparatus for welding or burning operations in any desired position and is truly a universally positionable welding machine.

A preferred exemplary and alternative exemplary embodiment of the universally positionable welding machine carriage and track assembly for mounting a welding head apparatus for longitudinal movement in selectable radially extending positions will now be explained in detail. Reference will be made to the appended sheets of drawings in which:

FIG. 1 is a perspective view of a preferred exemplary embodiment of the welding machine carriage and track assembly according to the present invention mounting a conventional welding head apparatus for longitudinal movement in selectable radially extending positions;

FIG. 2 is a detail view of a portion of the track means of the assembly of FIG. 1;

FIG. 3 is a section view of the track means apparatus of FIG. 2 taken therein along the plane III—III;

FIG. 6 is a detailed section view of an exemplary roller bearing means taken in FIG. 4 along the plane VI—VI.

FIG. 7 is a detail rear elevational view of the carriage and track means of FIGS. 1 and 4, but with an alternative exemplary embodiment of air bearing means for mounting the carriage means upon the track means;

FIG. 8 is a plan view of an exemplary embodiment of air bearing means employed in the carriage and track assembly of FIG. 7;

FIG. 9 is a section view of the exemplary air bearing means of FIG. 8 taken therein along the plane IX—IX;

FIG. 10 is a schematic representation of an exemplary air supply system for the air bearing means of the alternative exemplary embodiment; and FIG. 11 is a plan view of a further alternative exemplary embodiment of air bearing means.

Referring initially to FIG. 1, a preferred exemplary embodiment of a universally positionable welding machine carriage and track assembly is shown mounting a conventional welding head apparatus, indicated generally at 10, for longitudinal movement in selectable radially extending positions. The welding head apparatus, indicated generally at 10, may be an electrically operated arc welding apparatus, a torch device or any other conventional welding tool conventionally employed on welding machines. In FIG. 1, the burning head apparatus which may be gas or electrical, indicated generally at 10, is being employed to burn through and thereby cut a steel plate 11 by means of the electric arcing tool 12. Plate 11 is shown positioned horizontally upon a supporting frame or bed 13. However, as particularly contemplated within the present invention, the conventional welding head apparatus, indicated generally at 10, can be positioned in selectable radially extending positions by means of the welding machine carriage and track assembly, as hereinafter described in detail, in order to weld, burn or perform any other conventional welding operation throughout a full 360° arc about the longitudinal axis of the assembly.

Figure 4:
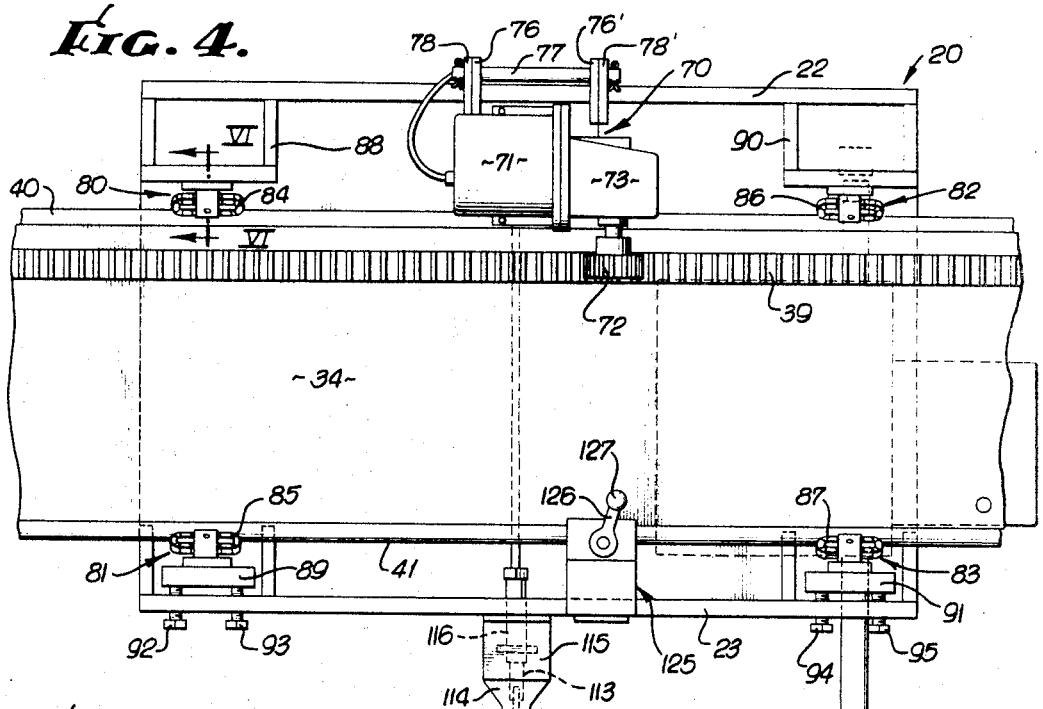
FIG. 4 is a rear elevational view of a portion of the welding machine carriage and track assembly of FIG. 1 taken therein along the plane IV—IV.
Figure 5:
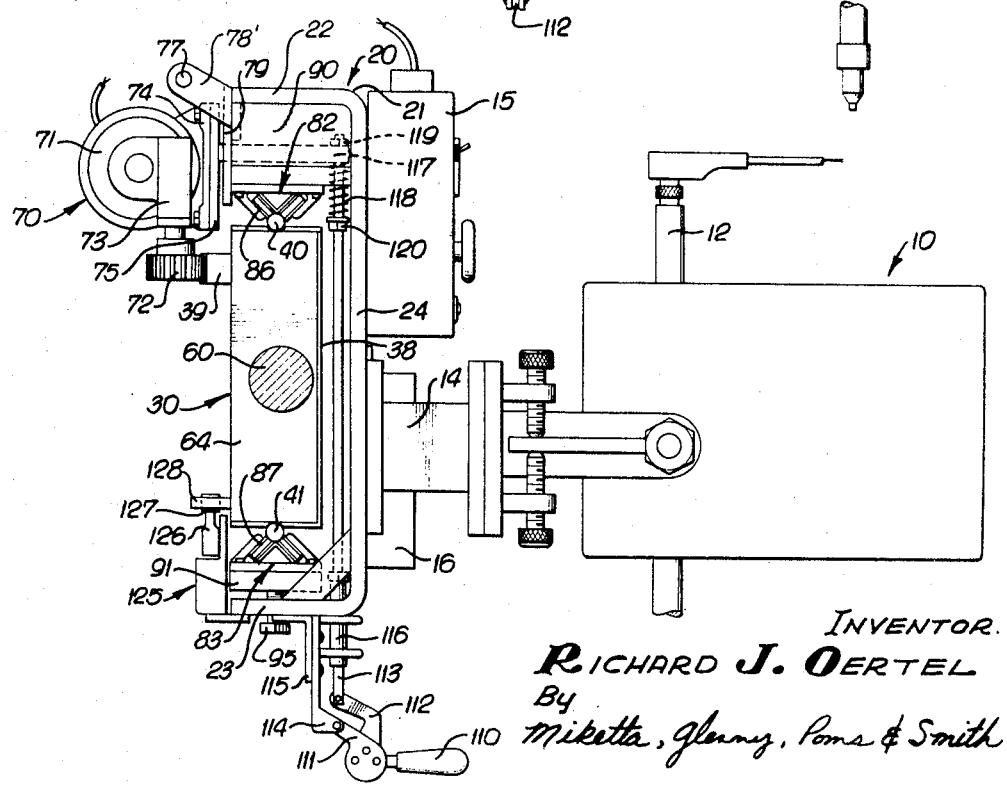
FIG. 5 is a side elevational view, partially in section, of the assembly of FIG. 1 taken therein along the plane V—V.

In the preferred exemplary embodiment of FIG. 1, the universally positionable welding machine carriage and track assembly, according to the present invention, includes generally carriage means, indicated generally at 20, for mounting a welding head apparatus as indicated generally at 10; track means, indicated generally at 30, upon which the carriage is longitudinally movable; and track mounting means including, in the exemplary embodiment, a pair of vertically adjustably standards 50 and 50' for mounting the track means in a generally horizontal disposition and for rotation about its longitudinal axis. As seen in FIGS. 4 and 5, motor means, indicated generally at 70, are mounted upon the carriage to drive it in a reciprocating movement along the track means, indicated generally at 30.

The carriage means provided for mounting the welding head apparatus as indicated at 10 to the track means, indicated generally at 30, is best seen in FIGS. 4 and 5. In the exemplary embodiment, such track means, indicated generally at 20, includes a channel or U-shaped body member 21 having top and bottom flanges, 22 and 23 respectively, interconnected by the web 24. The conventional welding head apparatus, indicated generally at 10, may be fixed to the carriage web or front wall in conventional manner as by a flange or cantilever member 14. Normally, the carriage will also mount other conventional apparatus such as an electric arc strength control means 15 and a master panel of control switches 16.

The carriage means, indicated generally at 20, is mounted upon a track means having upper and lower bearing surfaces extending longitudinally thereon to receive roller bearing means associated with the carriage means as hereinafter explained. Referring first to FIGS. 1, 2 and 3, it can be seen that the track means, indicated generally at 30, in the exemplary embodiment comprises an assembly of a channel or body member 31 having upper and lower flanges 32 and 33, respectively, and an interconnecting web 34. Re-inforcing means are welded to the web 34 between flanges 32 and 33 in order to increase the track body 31 vertical and lateral rigidity along its longitudinal extent during rotation thereof. It has been found that such rigidity can be attained by welding a re-inforcing plate 35 to the web 34 to increase the body 31 vertical rigidity and by welding the spaced re-inforcing means 36 and 37 to the plate 35 in order to increase the lateral rigidity thereof. The track channel member and re-inforcing means are preferably made of steel members. A metal cover plate 38 is also preferably provided to extend between flanges 32 and 33 enclosing the channel member 31 and overlying the re-inforcing means welded therein. A longitudinally extending rack gear 39 is provided along the upper rear portion of web 34 by welding or by bolting, as shown in FIG. 3, to cooperate with motor means, indicated generally at 70, provided on the carriage as hereinafter explained.

Upper and lower bearing surfaces 40 and 41 are provided along the upper and lower track means flanges 32 and 33, respectively. Bearing surfaces 40 and 41 are preferably outwardly convex and, in the exemplary embodiment, comprise a pair of longitudinally extending round bars fastened by bolts, as bolts 42 and 43 in FIG. 3, to the track means flanges in recesses provided therein, as recess 44 as shown in FIG. 6. The track means upper and lower bearing surfaces 40 and 41 are preferably convex in order to present bearing surfaces which can cooperate with bearing means on the carriage means for transmitting both vertical and lateral loading therebetween so as to allow relative movement therebetween even though rotated into other than a vertical disposition as seen in FIG. 3.

The bearing surfaces 40 and 41 are preferably made from cold rolled, polished and ground, or polished hardened ground, metal ways in order to obtain the desired accuracy of carriage travel thereon during operation of the carriage means thereon.

Track mounting means are provided for mounting the track means, indicated generally at 30, in a generally horizontal disposition and for rotation about its longitudinal axis. Such rotation of the track means is employed to place the welding head apparatus, indicated generally at 10, in selectable radial positions for welding operations laterally, vertically or in any radial direction about the longitudinal axis of the track means. Such track mounting means, in the exemplary embodiment, includes the provision of a pair of spaced vertically adjustable standards, indicated generally at 50 and 50', having sleeve journal means for rotatably receiving and supporting round bearing members 60 and 60' provided on the track means. Each of the standards, indicated generally at 50 and 50', may include a post 51, 51' received within a cylinder 52, 52' mounted upon a round base 53, 53'. The cylinders 52, 52' may be supplied with hydraulic fluid, as by hose 54, from a source of hydraulic fluid under pressure to hydraulically power raise or lower the posts 51 and 51' into selected vertically adjustable position. Each post 51, 51' is provided with a sleeve 55, 55' fixedly secured thereon which mounts a laterally extending journal means 56, 56'. Journal means 56, 56' are round or sleeve journals for receiving and rotatably supporting the round bearing members 60 and 60' on the track means, indicated generally at 30. The track means may be rotated manually on its round bearing member 60, 60' and held in a selected position of rotation by turning down the set screws 57, 57', or other similar fastening means, provided on the journals 56, 56'.

Each of the round bearing members 60 and 60' are mounted at the longitudinal ends of the track means channel body 31 to provide round bearing member extensions thereof. As best seen in FIGS. 2 and 3, each round bearing member extension, as bar 60, is provided with a flat 61 which seats against a bearing block 62 welded or bolted, as by bolts 63 to the channel body 31 of the track means. In the exemplary embodiment, each such bearing block 62 is bolted to the re-inforcing plate 35 which in turn is welded to the inner surface of the channel body web 34. The round bearing member extensions are welded to their respective bearing blocks along their lateral edges, the flats, as flat 61, providing greater areas for welding the bars to the bearing blocks than would otherwise be available. End plates, as plate 64 in FIGS. 2 and 5, are provided to enclose the track means ends about the bearing extension, as extension 60 in FIGS. 2 and 5.

Roller bearing means are provided on each of the carriage upper and lower flanges 22 and 23 to movably mount the carriage means, indicated generally at 20, on the track means, indicated generally at 30. As best seen in FIG. 5, the carriage means upper flange 22 comprises a first carriage portion overlying the upper bearing surface 40 on the track means while the lower carriage flange 23 comprises a second carriage portion underlying the lower bearing surface 41. In the preferred exemplary embodiment, such roller bearing means, indicated generally at 80, 81, 82 and 83 respectively, each includes bearing elements engaging the associated convex bearing surface along laterally spaced locations thereon to transmit both vertical and lateral loading between the carriage and track. While in the exemplary embodiment, two such roller bearing means are provided on each of the upper flange or carriage first portion 22 and two such bearing means are provided on the lower flange or carriage second portion 23, it is contemplated that in alternative embodiments only three such bearing means can be employed, two such means being on one flange, preferably the top carriage flange, and one such roller bearing means being on the bottom flange. As best seen in FIG. 4, each of the roller bearing means, indicated generally at 81 and 83, mounted on the carriage lower flange 23, includes bearing elements 85 and 87 mounted upon adjustable bearing blocks 89 and 91, respectively. Blocks 89 and 91 may be adjustably mounted to the lower flange 23 by the adjustable set screws or bolts 92, 93, 94 and 95, as seen in FIGS. 4 and 5. The upper bearing means, indicated generally at 80 and 82, may include bearing elements 84 and 86 mounted upon stationary bearing blocks 88 and 90, respectively, fabricated out of metal plates welded together into the box configuration secured to the upper flange 22 and web 24 of the carriage means as seen in FIGS. 4 and 5.

The construction of the exemplary roller bearing means employed is best seen in FIG. 6. Any equivalent roller bearing means may be employed so long as it includes bearing elements which engage the associated bearing surfaces in a manner to transmit not only vertical loading between the carriage means and track means, but also transmit lateral loading therebetween through cooperation with the single upper and single lower convex bearing surfaces provided on the carriage and track means assembly according to the present invention. The exemplary roller bearing means each includes a stationary support or base 100 as seen in the exemplary roller bearing means, indicated generally at 80 in FIGS. 4 and 6. The bearing elements engaging the associated convex bearing surface include a pair of convergently inclined endless roller bearing chains 84, 84' including a plurality of concave surfaced bearing rollers mounted to roll about inner races 101 and 102 pivotally mounted to base 100 by shafts 103 and 104, respectively. Each of the roller bearing chains or bearing elements 84 and 84' is thereby adapted to roll along the round bearing member, as member 40 in FIG. 6, along laterally spaced locations thereon to transmit both vertical and lateral loading between the carriage and track means.

Motor means are mounted on the carriage means to drive it along the rotatable track means after the carriage and track means have been rotated into and held in any desired position on the spaced standards. Such motor means, in the exemplary embodiment as indicated generally at 70, includes an electric motor 71 which drives pinion gear 72 by way of a speed reduction mechanism 73. Pinion gear 72 is adapted to mesh with the rack gear 39 to drive the carriage, indicated generally at 20, along the track means, indicated generally at 30, when the motor 71 is operated through actuation of the appropriate controls preferably incorporated in the control panel 16. Motor mounting means are provided for selectively disengaging the motor and its pinion 72 from the track means and rack gear 39. As seen in FIGS. 4 and 5, motor 71 is mounted by its flanges 74 to a plate 75 pivoted by arms 76 and 76' to the pivot bar 77 which is journaled in flanges 78 and 78' secured to a plate 79 depending from carriage flange 22. Downward movement of handle 110 causes the motor 71 and its pinion gear 72 to swing about pivot bar 77 away from the rack gear 39. Such movement is caused by the action of handle 110 on the conventional linkage members 111 and 112 acting on the rod 113, member 111 being mounted to a flange 114 secured to an angle bracket 115 fastened to the carriage bottom flange 23, and rod 113 being vertically movable within the sleeve 116 also secured to the flange 114. The upper end of rod 113 is loosely received through a cross rod 117 connected to the pivoted plate 75. The downward movement of rod 113 causes a downward rocking of bar 117, about the pivot bar 77, the crossbar 117 and rod 113 being held in loose assembled relation by the combined action of the spring 118 and fasteners or bolts 119 and 120. Upward movement of handle 110 causes inward pivoting of the motor means 71 to bring its pinion gear 72 back into driving engagement with the rack gear 39. From the foregoing, it can be seen that motor means provided may be selectively connected or disconnected to allow manual positioning of the carriage along the rotatable track means, indicated generally at 30.

The aforedescribed rack and pinion type drive is preferred where the track means is employed in a generally horizontal disposition and the amount of back-lash encountered is minimal. However, it is contemplated that the carriage and associated bearing means of the present invention can be employed also with a track means positionable into various vertical dispositions. In that event, a conventional ball screw drive system is preferred for driving the carriage means along the track means. Such vertical disposition of the track means may be desired for vertical welding or burning operations with the track means herein disclosed mounted to an otherwise conventional tilting type welding machine positioner or a vertical column.

Switch means, indicated generally at 125, may be provided for controlling reciprocal movement of the carriage means, indicated generally at 20, on the track means. Such switch means, may include a switch arm 126 having a cam 127 adapted to contact limit pins mounted to the track means to cause reversal of motor means 70. One such limiting pin is shown at 128 in FIGS. 4 and 5 mounted to the back of the track means web 34. The carriage means may thus be reciprocated back and forth on the track means by conventional operation of motor means 70 through the switch means 125.

An alternative exemplary embodiment of bearing means for mounting the carriage means to the track means is illustrated in FIGS. 7 through 10. In the alternative exemplary embodiment, such bearing means includes the provision of bearing means having a plurality of air ports therein provided with a supply of air under pressure to provide air jet bearings for the carriage means.

Referring first to FIG. 7, the carriage means, indicated generally at 20, and track means, indicated generally at 30, of the preferred exemplary embodiment are shown with the alternative exemplary embodiment of air jet bearings, indicated generally at 130. Each such air jet bearing, indicated generally at 130, includes a bearing block 131, preferably made from bronze or a fine grade of cast iron, pivotally mounted to a rotatable support block 132 rotatably mounted to the carriage means. In FIG. 7, the upper bearing block 131 is pivoted about an axis 133 by a pair of standards affixed to support block 132. Support block 132 is rotatably held against carriage member 134 by the hex head bolt 135 which seats on and also is rotatable relative to boss 136 formed integrally or welded to member 134. Support member 132 and bolt 135 may thus rotate relative to the stationary carriage member 134 and its boss 136 to allow alignment of the pivoted bearing block 131 on track way 40.

In the lower portion of FIG. 7, the lower bearing block 131' is pivoted to its support block 132' about axis 133' by a pair of standards formed or welded to support block 132'. Support member 132' is rotatably mounted upon the stationary adjustable bearing member 134' by means of the hex head bolt 135' underlying the boss 136' formed integrally of member 134'. Adjustable screws 137 and 138 are provided, as in the prior exemplary embodiment, for adjusting the height of the bearing means to bring lower bearing block 131' into engagement with lower track way 41.

As seen in FIGS. 8 and 9, the exemplary embodiment of air jet bearing block includes an inner air plenum 140 having a plurality of air jet openings or ports 141. Air plenum 140 may be formed in a solid block by drilling from one end thereof and tapping such end to provide an internal thread for receiving the fitting 142. It is also contemplated that the air jet bearing block 131 may be cast with an internal air plenum of rectangular or other cross section. Fitting 142 is adapted to receive an air hose 143 to supply air under pressure to the plurality of air ports 141 formed in the concave surface 144 and communicating with the inner air plenum 140. The radius of curvature for concave surface 144 may vary according to the diameter of round bar or other convex bearing surface employed for the bearing ways 40 and 41 on the track means.

A schematic representation of an air supply system for the air jet bearings of the present alternative exemplary embodiment is illustrated in FIG. 10. An arrangement of two upper air jet bearing means, indicated generally at 130 and 130', together with a single lower air jet bearing means, indicated generally at 130", is illustrated for mounting the carriage means (not shown) on the exemplary track means, indicated generally at 30. Each of the air jet bearing means is provided with a fitting 142 and appropriate air lines or hoses to a source of air under pressure, indicated generally at 145. Most automatic welding machines have a source of air under pressure for operating other equipment on the machine which can be readily adapted for use with the present air jet bearing means. However, such source of air under pressure should be filtered, as by an air filter means, indicated generally at 146, and controlled by a conventional or standard air regulator and gauge apparatus, indicated generally at 147. A standard air line lubricator means is illustrated in the air hose connections at 148.

I have found that a carriage means and welding apparatus assembly weighing approximately two hundred pounds can be easily supported and moved along the associated track means with the air jet bearing means of FIGS. 8 and 9 arranged in the manner shown in FIG. 10 with as little as twenty-five pounds per square inch air pressure being supplied thereto. In such arrangement, I have found that the air jet bearing blocks of FIGS. 8 and 9 operate very well when 26 air jet ports, each having $3/32''$ diameters, are employed. Eight holes are positioned along the major axis of concave surface 144 while nine holes are positioned off-set and laterally on either side of the center row of holes or ports, as best seen in FIG. 8. Approximately $3/4''$ at either end of the concave surface 144 should be retained intact without any air jet ports therein. The spacing between longitudinally adjacent ports 141 may be approximately $3/8''$ in the embodiment of FIG. 8. The air jet bearing block in arrangement of air jet ports 141 illustrated in FIG. 8 is suitable for use with $9/16''$ diameter track ways.

When larger diameter track ways, such as $3/4''$ diameter bars are employed for the track ways 40 and 41, the further alternative exemplary embodiment of air jet bearing means of FIG. 11 may be employed. As illustrated in FIG. 11, the air jet bearing means may employ the same size block 131 with three center ports 150 and eight side or lateral ports 151. Ports 150 may have a diameter of approximately $1/4''$ while ports 151 may have a diameter of approximately $7/64''$. The spacing between air jet ports 150 may be approximately $15/16''$ while the center spacing of the lateral smaller diameter ports 151 may be approximately $25/32''$.

Having thus described a preferred exemplary embodiment of the universally positionable welding machine carriage and track assembly, according to the present invention, it can be seen readily by those skilled in the art that various heretofore difficult and inconveniently located welding operations can be performed by the present assembly mounting the appropriate welding head apparatus. The carriage mounting the welding head apparatus can be manually or motor driven along the longitudinally extending track means. The track means, with its carriage thereon, can be rotated through a full 360 degree arc about its longitudinally extending round bearing member extensions 60 and 60' to place the welding head apparatus associated therewith into any desired radially extending position. While the electrical wiring for the welding head apparatus, the electric arc strength control 15 and the master control panel 16 have not been shown or explained in detail, such electrical connections are well-known in the art, form no part of the present invention and can be accomplished as in present conventional installations. It should be kept in mind, however, in connecting such electrical wiring as well as that for the motor means 71 that the track and carriage means are rotatable about their longitudinal axes so that sufficient length of wiring must be provided to avoid restricting such rotation.

Having thus described a preferred exemplary embodiment of the welding machine carriage and track assembly according to the present invention, it should be noted that other embodiments, modifications and refinements thereof may be made within the scope of the present invention which is defined and limited only by the following claims.

I claim:
1. A universally positionable welding machine carriage and track assembly adapted to mount a welding head apparatus for longitudinal movement in selectable radially extending positions, said assembly comprising:
    track means having upper and lower bearing surfaces extending longitudinally thereon to receive cooperating bearing means thereon;
    carriage means for mounting a welding head apparatus to said track means for longitudinal reciprocation thereon, said carriage means including a first portion overlying said upper bearing surface and a second portion underlying said lower bearing surface;
    bearing means on each of said carriage means first and second portions cooperating with said track means bearing surfaces for movably mounting said carriage means on said track means, said first and second portions and each of said bearing means re- maining in cooperative relationship notwithstanding said track means being rotated; and track mounting means for mounting said track means for rotation about its longitudinal axis to place said welding head apparatus in selectable radial positions through rotation of said track and carriage means preparatory to longitudinal movement of said carriage along said track means.

2. A welding machine carriage and track assembly as in claim 1 wherein:

said upper and lower bearing surfaces are convex and each said bearing means includes bearing elements bearing upon the associated convex bearing surface along lateraly spaced locations thereon to transmit both vertical and lateral loading between said carriage and track means.

3. A welding machine carriage and track assembly as in claim 2 wherein:

said bearing means are roller bearing means and said bearing elements each include a plurality of concave surfaced bearing rollers mounted in an endless chain about a stationary inner race to bear on said associated convex bearing surface.

4. A welding machine carriage and track assembly as in claim 2 wherein:

said bearing means are air jet bearing means and said bearing elements each include a plurality of longitudinally extending air jets providing an air cushion between said bearing means and said associated convex bearing surface.

5. A welding machine carriage and track assembly as in claim 2 wherein:

said track means includes a channel shaped body member having upper and lower flanges and round bars are fastened to said flanges to provide said upper and lower bearing surfaces.

6. A welding machine carriage and track assembly as in claim 5 wherein:

said carriage means includes a generally U-shaped body having upper and lower flanges providing said first and second portions; said track means includes a longitudinally extending rack gear along a side thereof; and motor means are mounted on said carriage, said motor means including a pinion gear engaging said rack gear, to drive said carriage means along said rotatable track means when said carriage means is in any radial disposition about the axis of said track means.

7. A welding machine carriage and track means assembly as in claim 1 wherein said track mounting means includes:

a pair of round bearing member extensions, each of said extensions being secured to said track means adjacent a longitudinal end thereof, and a pair of spaced vertically adjustable standards having sleeve journal means for rotably receiving and supporting said track means round bearing members to mount said track means in a generally horizontal disposition.

8. A welding machine carriage and track means assembly as in claim 1 wherein:

said track means includes a channel shaped body member having a web portion between upper and lower flanges and re-enforcing means welded to said web for increasing its vertical and lateral rigidity along its longitudinal extent during rotation thereof.

9. A welding machine carriage and track means assembly as in claim 6 wherein:

said track means is also provided with a cover plate extending between said upper and lower flanges and overlying said re-enforcing plate means.

10. A welding machine carriage and track means assembly as in claim 6 wherein:

means are provided for mounting said motor means on said carriage means for selective disengagement and re-engagement of said motor means pinion gear with said track means rack gear to allow manual movement of said carriage means along said track means into a selected longitudinal position of use.

11. A welding machine carriage and track means assembly as in claim 1 wherein said track mounting means mounts said track means for at least 180 degrees rotation in either direction from a initial vertical positioning of the track means.

References Cited
UNITED STATES PATENTS

| | | | |
|---|---|---|---|
| 1,550,651 | 8/1925 | Charter | 219—124 |
| 1,860,172 | 5/1932 | Chapman | 219—125 |
| 2,303,720 | 12/1942 | Berkeley | 219—124 |
| 2,745,935 | 5/1956 | Powley | 219—124 |
| 2,900,486 | 8/1959 | Williams et al. | 219—125 |
| 2,938,997 | 5/1960 | Anderson | 219—124 |
| 2,944,141 | 7/1960 | Lovrenich | 219—124 |
| 3,019,328 | 1/1962 | Brashear et al. | 219—125 |
| 3,072,779 | 1/1963 | Masters et al. | 219—125 |
| 3,171,012 | 2/1965 | Morehead | 219—124 |

JOSEPH V. TRUHE, Primary Examiner

W. D. BROOKS, Assistant Examiner